United States Patent [19]

Seki et al.

[11] 4,389,310

[45] Jun. 21, 1983

[54] COLD TRAP

[75] Inventors: Katsumi Seki, Hitachi; Yasuo Tachi, Tokyo; Yoji Shibata, Funabashi, all of Japan

[73] Assignee: Hitachi, Ltd., Tokyo, Japan

[21] Appl. No.: 972,212

[22] Filed: Dec. 22, 1978

[30] Foreign Application Priority Data

Dec. 26, 1977 [JP] Japan .............................. 52-155588

[51] Int. Cl.$^3$ ............................................ B01D 35/06
[52] U.S. Cl. .................................. 210/183; 210/184; 210/311; 210/444
[58] Field of Search ............................... 210/179–184, 210/311, 440, 444

[56] References Cited

U.S. PATENT DOCUMENTS

| 2,375,232 | 5/1945 | McNitt | 210/180 X |
| 2,712,931 | 7/1955 | Maddock | 210/444 X |
| 3,503,511 | 3/1970 | Spitzberg | 210/444 X |
| 3,618,770 | 11/1971 | Pohl et al. | 210/184 X |
| 3,693,959 | 9/1972 | Swinhoe et al. | 210/183 X |
| 3,724,665 | 4/1973 | Hall | 210/440 X |
| 3,962,082 | 6/1976 | Hundal | 210/184 X |

FOREIGN PATENT DOCUMENTS 50-32051 10/1975 Japan .

*Primary Examiner*—Robert H. Spitzer
*Attorney, Agent, or Firm*—Antonelli, Terry & Wands

[57] ABSTRACT

A cold trap disposed in a system in which liquid sodium is circulated as a heat exchanging medium, and adapted for removing impurities from the liquid sodium. The cold trap has a vessel in which defined are a cooling zone for cooling the liquid sodium containing the impurities, trapping zone in which the precipitated impurities are trapped and separated from the liquid sodium and an economizer zone in which the purified liquid sodium is reheated. The cooling zone and the economizer zone are disposed adjacent to each other, so that the purified sodium flowing through the economizer zone may be heated by the liquid sodium flowing through the cooling zone. The trapping zone is disposed in the passage of the liquid sodium interconnecting the heating and economizer zones.

9 Claims, 2 Drawing Figures

COLD TRAP

BACKGROUND OF THE INVENTION

The present invention relates to a cold trap for removing impurities from liquid sodium which is circulated, as a heat exchanging medium, in atomic energy plant having a fast breeder.

In atomic energy plant having a fast breeder, the liquid sodium used as the heat exchanging medium is circulated in a closed loop including the reactor core of the fast breeder and an intermediate heat exchanger or a steam generator, through a piping having various valves and pumps, so as to receive the heat from the reactor core and deliver the same to water, thereby to generate steam. Thus, the circulation of the liquid sodium is continued without any suspension, as long as the breeder is working.

During the circulation of the liquid sodium, the concentration of impurities is gradually increased due to generation of sodium oxides by oxygen contained by the liquid sodium and accumulation of metallic impurities, fission products and the like. These impurities are carried and conveyed by the liquid sodium, as the latter is circulated, incurring various troubles in the associated parts of the sodium circulation system. For instance, the impurities attaching to the external surface of fuel pin in the reactor core may cause a local overheating of the fuel pin, resulting in a breakage of the latter. Also, the scale of impurities attaching to the surface sodium handling apparatus is liable to promote the corrosion of the portion of the apparatus to which the scale attaches.

As is well known, these impurities are precipitated and separated as the temperature of the liquid sodium is lowered. In order to avoid above-stated troubles, through removing the impurities by making use of this phenomenon, it has been proposed to incorporate in the sodium circulation system a cold trap adapted to cool the liquid sodium and to separate the precipitated impurities from the cooled liquid sodium, so as to continuously purify the latter.

The cold trap usually has a vessel having a sodium inlet and outlet and a passage of sodium disposed in the vessel. The sodium is cooled as it flows along the passage, and the precipitated impurities are trapped before the liquid sodium is returned to the sodium circulation system.

To explain in more detail about a typical conventional cold trap, by way of example, the liquid sodium to be purified, which has been introduced into the vessel through the sodium inlet port formed at an upper portion of the vessel, is made to flow downwardly along an annular passage formed by the inner peripheral surface of the vessel. As the liquid sodium flows down along the annular passage, it is kept in contact with cooling means disposed in the annular passage, so as to be cooled by a cooling gas which is circulated in the cooling means. Among the impurities precipitated as a result of the cooling, the solid impurities of relatively large particle sizes are deposited to and accumulated on the bottom of the vessel, while the impurities of relatively small particle sizes are made to flow together with the liquid sodium. The liquid sodium then makes a turn at the bottom of the vessel and then flows upwardly through a central passage formed in the center of the vessel. In the central passage for the liquid sodium, disposed is a wire mesh made of stainless steel, so as to trap the aforementioned impurities of small particle sizes. The purified liquid sodium then leaves the wire mesh and flows back into the sodium circulation system, through the sodium outlet formed in the center of the vessel. This type of cold trap is disclosed in Japanese Patent Publication No. 32051/1975.

This type of cold trap, however, involves various problems. Namely, since the impurity-trapping means is disposed in the central passage surrounded by the annular passage, the cooled liquid sodium is inconveniently reheated as it passes the upper part of the impurity-trapping means, so as to dissolve again not a small part of impurities which have once precipitated at a cost of cooling labour. The impurities dissolved again in the liquid sodium can never be trapped by the impurity-trapping means, and are conveyed again into the sodium circulating system, together with the outlet flow of the liquid sodium. This reheating of the liquid sodium is caused by the heat which is transferred to the liquid sodium in the impurity-trapping means, from the liquid sodium in the area around the sodium inlet at which the sodium temperature is still considerably high.

It has therefore been proposed to form a heat insulating layer filled with a gas, between the outer annular sodium passage and the impurity-trapping means. This however requires a complicated construction of the cold trap, and the cost of production of the cold trap is uneconomically raised for ensuring a sufficiently high reliability. In addition, if the structure for forming the heat-insulating gas layer is produced as a pressure-resistant vessel, the wall thickness of the structure is increased impractically. To avoid this, it is necessary to adopt such a structure as to allow a communication between the heat-insulating gas layer and the cover gas in the trap vessel, so as to establish a balance of pressure therebetween. Usually, the filling of the sodium circulating system with the liquid sodium after the building of the plant or after a periodical survey of the same is made conveniently by at first evacuating the sodium circulating system and then sucking the liquid sodium into the system by means of the vacuum. It is impossible to enjoy such a convenience in filling the sodium circulating system, when the above-mentioned communication between the heat-insulating gas layer and the cover gas in the trap vessel is allowed.

In addition, it is necessary to reheat the cooled sodium before it is returned to the sodium circulating system, for otherwise the cold liquid sodium may impart a thermal impact to the hot piping of the sodium circulation system. Conventionally, this reheating of the liquid sodium has been made by a specific economizer installed separately.

Under these circumstances, there is an increasing demand for a cold trap having a simple construction and, at the same time, capable of trapping the whole part of once-precipitated impurities without fail and recovering the high temperature of the liquid sodium before it is returned to the sodium circulation system.

SUMMARY OF THE INVENTION

It is therefore a major object of the invention to provide a cold trap which can trap and separate whole part of the once-precipitated impurities, without allowing the dissolution of the same.

It is another object of the invention to provide a cold trap capable of reheating the purified liquid sodium before the latter is returned to the sodium circulating system.

It is still another object of the invention to provide a cold trap capable of satisfying above-stated two objects simultaneously.

To these ends, according to the invention, there is provided a cold trap in which the sodium cooling zone and sodium heating zone are constituted by the same part of the trap and the impurity-trapping zone is defined beneath the sodium cooling and heating zones.

DESCRIPTION OF THE PREFERRED EMBODIMENT

Hereinafter, a preferred embodiment of the invention will be described, by way of example, with reference to the accompanying drawings.

Figure 1:
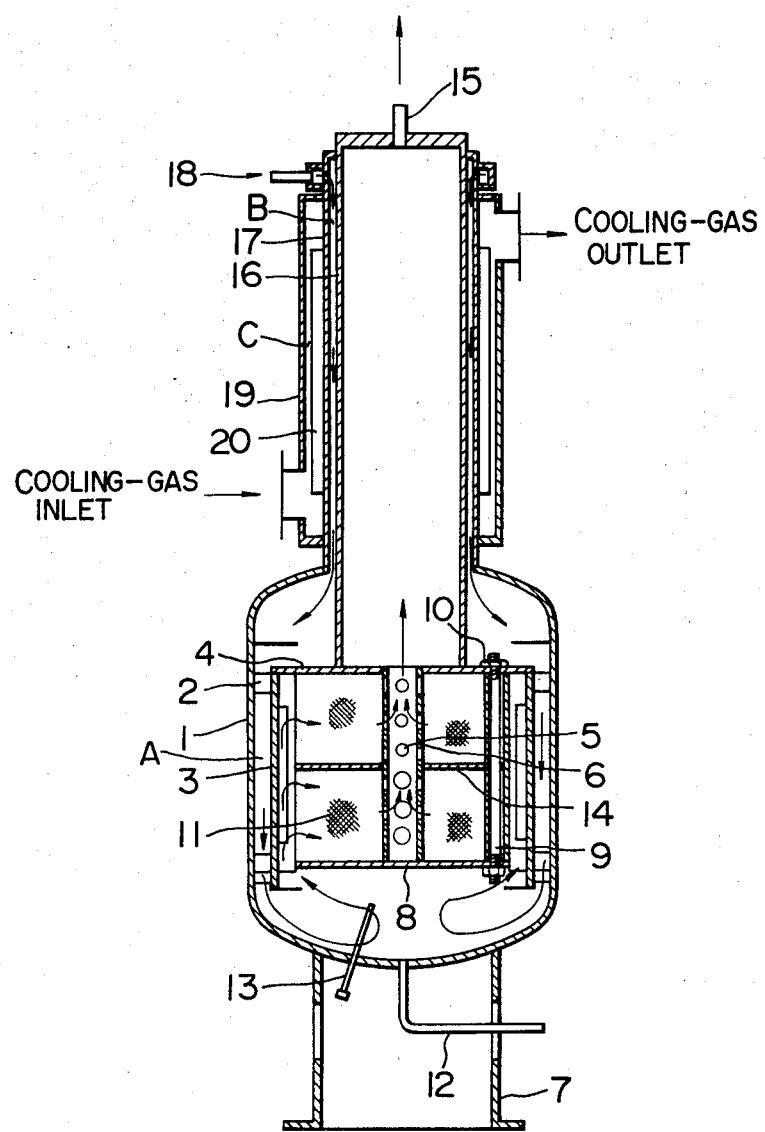
FIG. 1 is a side elevational sectional view of a cold trap embodying the invention.

Referring first to FIG. 1, a lower barrel 1 of a cold trap of the invention is supported by means of a supporting leg 7. A cylindrical guide plate 3 is attached to the inside of the lower barrel 1 by means of a plurality of fixtures 2. This guide plate extends in parallel with the inner peripheral surface of the lower barrel 1, so as to form therebetween a vertical passage A for the liquid sodium. The upper end of the guide plate 3 is closed by a cover 4 to the center of which attached is a vertical pipe 6 having a number of apertures 5 in its wall. The apertures 5 have a size large enough to allow the liquid sodium to pass therethrough. The lower end of the vertical pipe 6 is closed by a disc-shaped cover 8 which is secured to the upper cover 4 by means of a plurality of fixing rods 9 and cooperating nuts 10. The outer peripheral surface of the cover 8 opposes to the inner peripheral surface of the guide plate 3, so as to form therebetween an annular gap of such a size as to allow the liquid sodium to pass therethrough. A mesh 11 of stainless steel is disposed in the space defined by the upper and lower covers 4, 8 and the pipe 6. An annular space is formed between the outer peripheral surface of the mesh 11 and the inner peripheral surface of the guide plate 3. The cross-sectional area of this annular space is substantially equal to that of the annular gap formed between the outer peripheral surface of the lower cover 8 and the inner peripheral surface of the guide plate 3.

The mesh 11 is divided into an upper section and a lower section by means of a partition plate 14. The arrangement is such that the flow rates of the liquid sodium flowing through the upper and lower sections of the mesh 11 are materially equal to each other.

The upper and lower covers 4, 8, pipe 6 and the mesh 11 in combination constitute an impurity-trapping zone adapted to trap the impurities included by the liquid sodium.

A drain pipe 12 opens at its one end in the bottom of the lower barrel 1. This drain pipe 12 is provided at its intermediate portion with a drain valve (not shown). This valve is opened as required for draining the liquid sodium.

A thermocouple 13 disposed at a bottom portion of the lower barrel 1 is adapted to detect the temperature of the liquid sodium at that portion of the lower barrel.

An economizer cylinder 16 provided at its upper end with a liquid sodium outlet 15 is mounted on the upper cover 4. The economizer cylinder 16 is surrounded by an upper barrel 17 of the cold trap. The upper barrel 17 is attached at its lower end to the lower barrrel 1.

The upper barrel 17 and the economizer cylinder 16 cooperate with each other in defining therebetween an annular passage B for the liquid sodium. The annular passage B is in communication with the aforementioned annular passage A. A sodium inlet 18 is formed in the wall of the upper barrel 17 at an upper portion of the latter.

A gas jacket 19 is formed around the upper barrel 17. The gas jacket 19 is provided at its lower and upper portions with a cooling-gas inlet and a cooling-gas outlet, respectively. The wall of the upper barrel 17 and the wall of the gas jacket 19 cooperate with each other in defining therebetween a passage C for a cooling gas. As the cooling gas flows through the cooling-gas passage C, heat is exchanged, across the wall of the upper barrel 17, between the cooling gas and the liquid sodium flowing through the passage B, so that the liquid sodium is effectively cooled. Any desired gas can be used as the cooling gas which is made to flow through the cooling-gas passage C. A plurality of cooling fins 20 are attached to the outer surface of the upper barrel 17, so as to extend along the length of the cooling-gas passage C.

Figure 2:
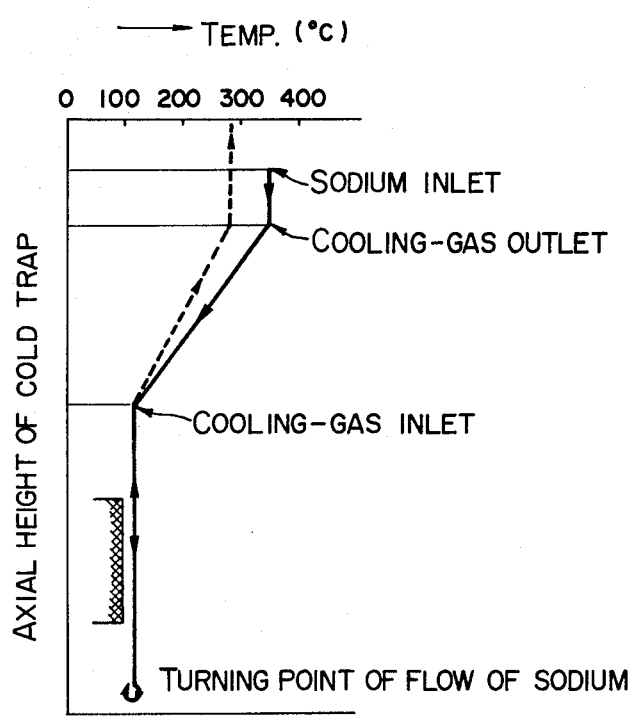
FIG. 2 is a diagram showing how the temperature of the liquid sodium is changed as the latter flows through the cold trap as shown in FIG. 1.

FIG. 2 shows how the temperature of the liquid sodium is changed as the latter flows through the cold trap of the invention. Assuming here that liquid sodium of 350° C. is introduced into the passage B, through the sodium inlet 18, at a flow rate of 8 l/min, the sodium is effectively cooled down to 120° C. as it reaches the lower end of the passage B, by a heat exchange with the cooling gas which is, in this case, air of 32° C.

The impurities in the liquid sodium cooled down to 120° C. are all precipitated and flows into the passage A together with the liquid sodium. Precipitated impurities having relatively large particle sizes are made to deposit on the bottom of the lower barrel 1. Taking into account that the precipitated impurities tend to deposit, it is preferred to provide the impurity-trapping zone at a lower part of the cold trap.

Meanwhile, precipitated impurities of relatively small particle sizes, which are still suspended by the liquid sodium, are made to flow together with the liquid sodium into the annular space between the guide plate 3 and the mesh 11.

The liquid sodium is then made to flow through the mesh 11 from the radially outer side to the radially inner side of the latter, toward the pipe 6. This radial flow of the liquid sodium through the mesh 11 is preferred to an axial flow, for the reasons stated below.

Namely, the maximum inlet area of the mesh 11 is presented when the radial flow is adopted, because the entire peripheral surface of the mesh 11 constitutes inlet area. In addition, it is possible to make the liquid sodium stay in the mesh 11 over a considerably long time, when the radial flow is adopted. Clearly, the longer the period of stay of liquid sodium in the mesh 11 becomes, the larger the chance in trapping the impurities by the mesh 11 grows. From this point of view, the radial flow is preferred because it can present a considerably large radial length between the outer peripheral surface of the mesh 11 and the pipe 6. At the same time, the impurities are more liable to be trapped at around the inlet surface of the mesh 11 than at the central part of the same. For this reason, it is preferred to provide a large inlet area.

If the liquid sodium is made to flow axially through the mesh 11, from the lower to the uper ends of the latter, the portion of the mesh 11 around the inlet surface, i.e. the portion around the lower end of the mesh 11, will be soon clogged with the impurities, so as to make the mesh 11 unserviceable, resulting in a shorter life of the cold trap, because the area of the lower end surface of the mesh 11 is apparently smaller than that of the outer peripheral surface of the same. For this reason, the axial flow of the liquid sodium through the mesh 11 is not preferred, although it can provide a considerably long passage for the liquid sodium across the mesh 11.

As will be understood from the above explanation, the precipitated impurities of smaller particle sizes, which are still suspended and carried by the liquid sodium, are effectively trapped by the mesh 11, as the liquid sodium flows radially inwardly through the latter. The low temperature of 120° C. of the liquid sodium is still maintained, when the liquid sodium flows through the mesh 11.

The liquid sodium thus purified is made to flow into the pipe 6 through the apertures 5, and then into the economizer cylinder 16. A heat exchange is performed between the purified liquid sodium which flows upwardly through the economizer cylinder 16 and the liquid sodium coming down through the passage B, so that the purified liquid sodium is heated up to 280° C. by the time it reaches the sodium outlet 15. For information, the temperature of the cooling air at the cooling-gas outlet is 70° C.

The length of the economizer cylinder 16 or the length of the gas jacket 19 is suitably selected in relation with the temperature of the cooling gas and other factors, such that the liquid sodium to be purified is cooled down to a temperature low enough to cause the precipitation of the impurities but not to excessively lower the fluidity of the liquid sodium, and that the purified liquid sodium leaving the economizer cylinder is heated to a temperature high enough to avoid various thermal troubles which may, for otherwise, be caused by the temperature difference between the purified sodium and the sodium in the sodium circulating system.

The economizer cylinder 16 may be extended upwardly, if it is impossible to recover a sufficiently high temperature of the purified sodium, so that the purified liquid sodium may make a heat exchange, when it flows through the extension of the economizer cylinder 16, with the liquid sodium circulated in the sodium circulating system.

The impurities deposited on the bottom portion of the lower barrel 1 is discharged together with the liquid sodium, when the latter is drained by opening the drain valve of the drain pipe 12 as necessitated. For an optimum control of the cold trap, the temperature and flow rate of the cooling gas and/or the flow rate of the liquid sodium are suitably adjusted to maintain an optimum temperature of the liquid sodium around the bottom of the lower barrel 1. The temperature of the liquid sodium in that portion is observed by means of the thermocouple 13.

As has been described, in the cold trap of the invention having the described construction, the zone for cooling and heating the liquid sodium and the zone for trapping the impurities are separated from each other in the vertical direction. The undesirable reheating of the liquid sodium in the trapping zone is therefore prevented and, accordingly, the dissolution of the once-precipitated impurities is avoided.

What is claimed is:
1. A cold trap disposed in a sodium circulating system and adapted for purifying the circulated sodium comprising:
  a sodium-cooling zone in which said sodium is cooled through a heat exchange with a cooling fluid of a low temperature;
  an impurity-trapping zone, for receiving cooled sodium from said sodium-cooling zone, adapted to trap the impurities precipitated in the cooled sodium;
  said impurity-trapping zone being disposed at a position where no heat exchange with said sodium-cooling zone occurs, so that the sodium is cooled in the sodium-cooling zone substantially to the temperature at which it passes through the impurity-trapping zone, whereby the temperature of the sodium in the impurity-trapping zone is substantially constant;
  an economizer zone adjacent to said sodium-cooling zone and adapted to reheat the sodium coming from the impurity-trapping zone through a heat exchange with the sodium flowing in said sodium-cooling zone; and
  a vessel in which said zones are defined,
  whereby heat exchange between said impurity-trapping zone and the sodium-cooling and economizer zones is avoided due to positioning of the three zones.
2. A cold trap as claimed in claim 1, wherein said impurity-trapping zone is defined under said economizer zone.
3. A cold trap as claimed in claim 1, wherein said impurity-trapping zone is spaced from said sodium-cooling zone.
4. A cold trap as claimed in claim 3, wherein said impurity-trapping zone is below the sodium-cooling zone.
5. A cold trap disposed in a sodium circulating system and adapted to purify the circulated sodium comprising:
  an upper barrel having a cylindrical body provided with a sodium inlet formed in the wall of said cylindrical body at an upper portion of the latter;
  an economizer cylinder having a sodium outlet and disposed within said upper barrel so as to cooperate with said upper barrel in defining therebetween an annular passage B for said sodium,
  a gas jacket disposed in its entirety around said upper barrel so as to cooperate with said upper barrel in defining therebetween a passage for a cooling gas, for cooling said sodium;
  a lower barrel attached to the lower end of said upper barrel, the space in said lower barrel being in communication with said passage B;
  an impurity trapping zone, including a mesh, disposed in its entirety in said lower barrel and adapted to trap the impurities in said sodium as said sodium coming from said passage B flows through said mesh; and
  sodium guiding means adapted to guide the purified sodium leaving said mesh to said economizer cylinder;
  wherein said economizer cylinder and gas jacket are disposed at an upper portion of said cold trap, while said impurity trapping zone is disposed at a lower portion of said cold trap, so that the sodium is cooled in the upper portion of the cold trap substantially to the temperature at which it passes through the impurity trapping zone, whereby the temperature of the sodium in the impurity trapping zone is substantially constant, and whereby the dissolution of precipitated impurities in the sodium in said impurity trapping zone, attributable to a reheating of said sodium in said zone, is avoided.

6. A cold trap as claimed in claim 5, characterized by further comprising a guide plate adapted to guide said liquid coming from said passage B to the bottom portion of said lower barrel.

7. A cold trap as claimed in claim 6, characterized by further comprising a cover for closing the lower end portion of said mesh, said cover cooperating with said guide plate in guiding said sodium to the outer peripheral surface of said mesh.

8. A cold trap as claimed in claim 7, wherein said guide plate, said cover and said sodium guiding means are positioned to guide the sodium to the outer peripheral surface of the mesh and then radially inward through the mesh to the sodium guiding means.

9. A cold trap as claimed in claim 5, wherein said sodium guiding means include a pipe disposed at the center of said mesh, said pipe having a plurality of apertures.

* * * * *